(12) United States Patent
Gottipati et al.

(10) Patent No.: US 7,555,770 B2
(45) Date of Patent: Jun. 30, 2009

(54) METHOD AND SYSTEM FOR CONTROLLING ACCESS TO DATABASE INFORMATION

(75) Inventors: Srinivasu Gottipati, Santa Clara, CA (US); Vivek Sharma, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 824 days.

(21) Appl. No.: 10/382,448

(22) Filed: Mar. 5, 2003

(65) Prior Publication Data

US 2009/0089681 A1    Apr. 2, 2009

(51) Int. Cl.
*H04L 9/32* (2006.01)

(52) U.S. Cl. .................................... 726/2; 726/3; 726/4

(58) Field of Classification Search ................. 726/2–7, 726/16–19, 26–30; 713/168, 182; 707/9, 707/10
See application file for complete search history.

(56) References Cited

U.S. PATENT DOCUMENTS

| | | | |
|---|---|---|---|
| 6,088,796 A * | 7/2000 | Cianfrocca et al. ......... 713/152 |
| 6,618,475 B2 * | 9/2003 | Marchand et al. ......... 379/145 |
| 7,185,197 B2 * | 2/2007 | Wrench, Jr. .................. 713/168 |
| 7,185,198 B2 * | 2/2007 | Nakamura et al. .......... 713/168 |
| 7,222,361 B2 * | 5/2007 | Kemper ......................... 726/4 |
| 2002/0042916 A1 * | 4/2002 | Mineyama .................... 725/39 |
| 2002/0186827 A1 * | 12/2002 | Griffiths ................ 379/207.02 |

OTHER PUBLICATIONS

Microsoft Computer Dictionary, 5th Edition, Copyright 2002 by Microsoft Corporation, Published by Microsoft Press, p. 465.*

* cited by examiner

*Primary Examiner*—Hosuk Song
(74) *Attorney, Agent, or Firm*—Townsend and Townsend and Crew LLP

(57) ABSTRACT

A method and system for controlling access to database information. One embodiment of the method includes a controlled interface through which database queries can be issued by an authorized user. Additionally, each authorized user may be granted access to specific scripts or tools that operate in conjunction with information stored by a database. Upon logging into the system, a user can be provided via the controlled interface a selection of scripts that he or she is authorized to use in conjunction with the database information. To enable operation of these scripts, specific information within the database is linked to particular scripts. Therefore, a user's access to database information is restricted by the scripts he or she can use with the database. When new information is added to the database and linked to specific scripts, it is automatically available to users granted access to one or more of those scripts.

28 Claims, 5 Drawing Sheets

METHOD AND SYSTEM FOR CONTROLLING ACCESS TO DATABASE INFORMATION

BACKGROUND

Computers have become integral tools used in a wide variety of different applications, such as in finance and commercial transactions, computer-aided design and manufacturing, health care, telecommunication, education, etc. Computers are finding new applications as a result of advances in hardware technology and rapid development in software technology. Furthermore, the functionality of a computer system is dramatically enhanced by coupling these types of stand-alone devices together in order to form a networking environment. Within a networking environment, computer users may readily exchange files, share information stored on a common database, pool resources, and communicate via electronic mail (e-mail) and video teleconferencing.

It is appreciated that all types of information and data can be stored by a commonly shared database. However, when confidential and/or sensitive information is stored on the shared database accessible by thousands of computer users, it may become desirable to control what information specific users have access to within the database.

One conventional approach for providing database access control is to create a read-only account in a database in the following manner. First, a user having unlimited access to the database logs into a write access account of the database. That user then prepares a list of all the tables, synonyms, views, packages, etc. that are available on the database. Next, a new read-only account is created for all of the users of the database. Additionally, within this read-only account, each database user is granted specific access to those particular tables, views, packages and the like of the previously prepared list that they have authority to access. However, there are disadvantages associated with this type of database access control.

For example, one of the disadvantages occurs when a patch (or updated version) of some software is applied to the original account and it added new tables, views, synonyms, packages, etc. to the database. As such, the read-only account does not know about this new information since they are not currently part of the availability list. As such, the availability list is updated in order to reflect the additional, modified and/or changed information of the database. Furthermore, the read-only account is also updated to enable authorized users access to the new and/or updated information. However, as the number of incoming patches becomes more and more numerous which can be common with larger databases, the task of continually updating the availability list and read-only account becomes overly cumbersome and difficult.

Another disadvantage is that in order to access an object in this previously described database access control system, a user who logged into the read-only account (or schema) is not directly in the specific database account whose objects (e.g., tables, views, etc.) the user wants to access. As such, they typically have to write specific commands involving a fully qualified name that precedes each object with the name of the database account to which the object belongs. For example, if a read-only account has been created from an account called "apps", then to access a table "fnd_diagnostics" from the read-only account, a user cannot just access it as "fnd_diagnostics". Instead, the user has to specify "apps.fnd_diagnostics". This can be cumbersome when utilizing a wide variety of script commands. Additionally, this problem is magnified if the user is running scripts that have been created by somebody else. Typically, when scripts are written, they do not use a fully qualified name because they are excepted to run against the original account or schema. Therefore, in order to run these type of scripts, they are modified and each object has to be fully qualified. This type of maintenance can become overly burdensome.

The present invention may address one or more of the above issues.

SUMMARY OF THE INVENTION

A method and system for controlling access to database information. One embodiment of the method includes a controlled interface through which database queries can be issued by an authorized user. Additionally, each authorized user may be granted access to specific scripts or tools that operate in conjunction with information stored by a database. Upon logging into the system, a user can be provided via the controlled interface a selection of scripts that he or she is authorized to use in conjunction with the database information. To enable operation of these scripts, specific information (e.g., tables, views, synonyms, etc.) within the database is linked to particular scripts. Therefore, a user's access to database information is restricted by the scripts he or she can use with the database. The database queries can get run against a pre-created read-only schema or account which can access substantially any information stored within the database. As such, when new information is added to the database and linked to specific scripts, it is automatically available to users granted access to one or more of those scripts.

In another embodiment, the present invention provides a method for controlling access to system information. The method includes determining whether a user is authorized to access a system. Provided the user is authorized to access the system, a determination is made as to whether the user is authorized to use a script with the system. Provided the user is authorized to use the script with the system, the user is enabled to use the script with the system to access information.

In yet another embodiment, the present invention provides a system for controlling access to database information. The system includes means for ascertaining whether a user is authorized to access a system. Additionally, the system includes means for ascertaining whether the user is authorized to use a database script with a database of the system, provided the user is authorized to access the system. Furthermore, the system includes means for capacitating the user to operate the database script with the database to access information stored by the database, provided the user is authorized to use the database script with the database.

In still another embodiment, the present invention provides a computer readable medium having computer readable code embodied therein for causing a system to perform certain functions. For example, the computer readable code may cause the system to ascertain whether a user is authorized to access a system. Provided the user is authorized to access the system, the computer readable code may cause the system to determine whether the user is authorized to use a database script with a database of the system. Provided the user is authorized to use the database script with the database, the computer readable code may cause the system to capacitate the user to operate the database script with the database to access information stored by the database.

While particular embodiments of the present invention have been specifically described within this summary, it is noted that the invention is not limited to these embodiments. The invention is intended to cover alternatives, modifications and equivalents which may be included within the scope of the invention as defined by the Claims.

BRIEF DESCRIPTION OF THE DRAWINGS

The accompanying drawings, which are incorporated in and form a part of this specification, illustrate embodiments of the invention and, together with the description, serve to explain principles of the invention.

DESCRIPTION OF THE PREFERRED EMBODIMENTS

Figure 1:
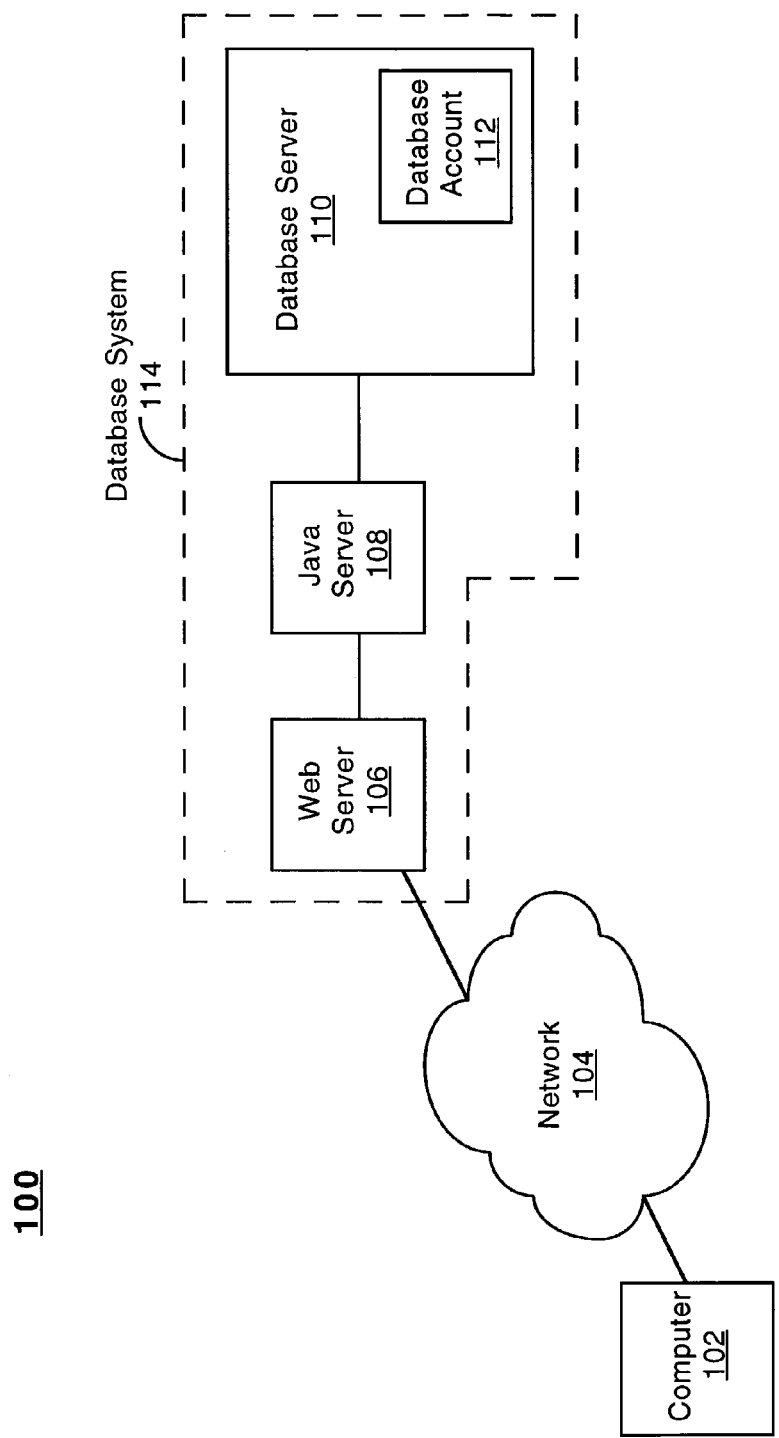
FIG. 1 is a block diagram of an exemplary system that includes a database system for controlling access to database information in accordance with an embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps may involve physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "providing", "determining", "activating", "enabling", "controlling", "transmitting", "receiving", "recognizing", "generating", "capacitating", "utilizing", "ascertaining", "storing" or the like, refer to the action and processes of a computing system, or similar electronic computing device, that manipulates and transforms data. The data is represented as physical (electronic) quantities within the computing system's registers and memories and is transformed into other data similarly represented as physical quantities within the computing system's memories or registers or other such information storage, transmission, or display devices.

FIG. 1 is a block diagram of an exemplary system 100 that includes a database system 114 for controlling access to database information in accordance with an embodiment of the present invention. Within system 100, a web server 106 provides a controlled interface through which database queries can be issued by an authorized user of a computer 102. Each authorized user may be granted access to specific scripts (or tools) that operate in conjunction with information stored by a database server 110. Upon logging into the system via web server 106, a user can be provided via the controlled interface a selection of scripts that the user is authorized to use in conjunction with the information stored by database server 110. As part of enabling operation of these scripts, specific information (e.g., tables, views, synonyms, etc.) within database 110 is linked to particular scripts. Therefore, in this manner a user's access to information of database 110 is restricted by the scripts he or she can use with database server 100.

It is understood that the database queries can get run against a pre-created read-only account (or schema) which can access substantially any information stored within database server 110. As such, when new information is added to the database 110 and linked to specific scripts, it is automatically available to users granted access to use one or more of those scripts.

Specifically, when computer 102 is communicatively coupled to web server 106 via network 104, a login process may be initiated in order to determine whether the user of computer 102 has been authorized to access database system 114. It is understood that there are a wide variety of ways to implement a login process in accordance with the present embodiment.

For example, the login process may involve requesting that the user of computer 102 of FIG. 1 provide a username and password. Once this information is submitted to web server 106, it then determines whether the received username and password represent an authorized user of database system 114. It is noted that this determination may involve, but is not limited to, web server 106 checking the received username and password against information stored within one or more of its files. If web server 106 determines that the received username and password do not represent an authorized user, it restricts computer 102 from accessing anything else within database system 114. However, if web server 106 determines that the received username and password represent an authorized user, it then determines what database scripts (or tools), if any, the user is authorized to use with database server 110. This determination may involve, but is not limited to, web server 106 accessing one or more of its files to retrieve this information. It is understood that a "superuser" of a Java™ server 108 and/or web server 106 may define beforehand which database scripts each authorized user may be able to invoke and utilize in conjunction with database server 110.

If the user is authorized to use one or more database scripts, web server 106 may then provide a list of them to computer 102 (via network 104) as part of a web page. Therefore, in this manner the user of computer 102 is provided the choice of which database scripts he or she would like to invoke and use in conjunction with database server 110.

Within FIG. 1, once computer 102 transmits a request to web server 106 in order to invoke one or more database scripts that its user is authorized to use, the web server 106 transfers that script request along with the accompanying username and password of the requesting user to Java server 108. Upon reception, Java server 108 may then determine whether the received username and password associated with the database script request represents a valid user. In this manner, a re-verification process is performed on the submitted username and password. If the username and password are not valid, Java server 108 rejects the database script request and subsequently notifies web server 106 of this rejection. In turn, web server 106 may then notify computer 102 (via network 104) of the rejection.

However, if the username and password are valid, Java server 108 may determine whether the user is currently authorized to invoke and use the database script(s) he or she is requesting. In this fashion, a re-verification process is performed as to whether the user is authorized to operate the requested database script(s). This determination may be done in diverse ways. For example, for each database script (or tool) there may be a stored metadata file that describes which users are currently authorized to run that script. As such, Java server 108 may access each metadata file associated with the request in order to determine if the user is authorized to operate that database script. If the user is not authorized to use one or more of the requested scripts, Java server 108 may specifically reject each database script request and notify web server 106 of any rejections. In response, web server 106 may then notify computer 102 (via network 104) of any database script rejections.

Conversely, if the user is authorized to use one or more of the requested database scripts (or tools), Java server 108 then retrieves a pre-created username and password (e.g., that may both be encrypted and stored in a secure location) for a database account 112. In this manner, the database account username and password are internal to database system 114 and provide additional security. It is understood that the database account username and password may be created or generated in a wide variety of ways. For example, the database account username and password may be generated by, but are not limited to, a random function generator that operates on Java server 108. Once the database account username and password are retrieved, Java server 108 communicatively couples to the pre-created database account (or schema) 112 resident to database server 110. It is noted that database account 112 may be implemented as a read-only account or schema in order to provide additional security for the information stored by database server 110.

Within FIG. 1, once communicatively coupled, Java server 108 provides the script request along with the database account username and password in order to login to database account 112 and invoke the desired script(s). It is appreciated that database account 112 determines whether the received database account username and password are valid. If not, database account 112 notifies Java server 108 that the script request has been rejected and that information is passed to web server 106 in order to inform the user of computer 102. If the database account username and password are valid, each script is invoked against database account 112. As such, database account 112 is utilized as a proxy for operating the database script(s). It is noted that database account 112 has substantially unlimited access to information stored by database server 110. Also, Java server 108 may instruct the database account 112 to switch to and use a different schema before invoking the queries. In this fashion, the script can operate in the same manner as if the script was directly running in the schema for which it was intend. As such, the script is able to run properly even if it does not use fully qualified names thereby avoiding one of the disadvantages of the conventional approach. Additionally, the scripts that operate in conjunction with database server 110 are associated with and/or are linked to information stored by database server 110. As such, the user's access to information stored by database server 110 is limited by the database scripts the user has been authorized to invoke and use. Furthermore, when new information is added to database server 110 and linked to specific database scripts, it is automatically available to users granted access to invoke and use one or more of those scripts which avoids one of the disadvantages of the conventional approach.

When one or more database scripts are operational on database server 110, any information they output are redirected to one or more files resident to Java server 108. Additionally, when one or more of the requested database scripts are operational on database server 110, this information is communicated by database server 110 to Java server 108 which then notifies web server 106 of this situation. In response to receiving this notification, web server 106 provides another web page to computer 102 (via network 104) for displaying information and/or content stored by database server 110. Specifically, the web page application operating on web server 106 couples to Java server 108 in order to read the one or more files which receive database output information from the operational database scripts. Once read, the web page application operating on web server 106 provides that information within the web page presented to computer 102 via network 104.

Within FIG. 1, system 100 includes computer 102 and web server 106 both coupled to network 104. It is appreciated that computer 102 and web server 106 may each be coupled to network 104 utilizing wired and/or wireless communication technologies. Additionally, network 104 may be implemented in a wide variety of ways in accordance with the present embodiment. For example, network 104 may be implemented as, but is not limited to, a local area network (LAN), a metropolitan area network (MAN), a wide area network (WAN) and/or the Internet. It is noted that system 100 is well suited to be implemented without network 104. As such, computer 102 may be communicatively coupled to web server 106 via wired and/or wireless communication technologies. Computer 102 may be implemented in a manner similar to computer system 500 of FIG. 5.

System 100 also includes Java server 108 coupled to web server 106 and database server 110. It is noted that Java server 108 of the present embodiment is well suited to be implemented as any type of server. As such, Java server 108 is not in anyway limited to be implemented as a Java server. Furthermore, Java server 108, web server 106, and database server 110 may each be implemented as a single physical computing system similar to computer system 500 or as multiple physical computing systems. Moreover, all of the functionalities of web server 106, Java server 108 and database server 110, as described herein, may be implemented on a single physical computing system similar to computer system 500.

Figure 2:
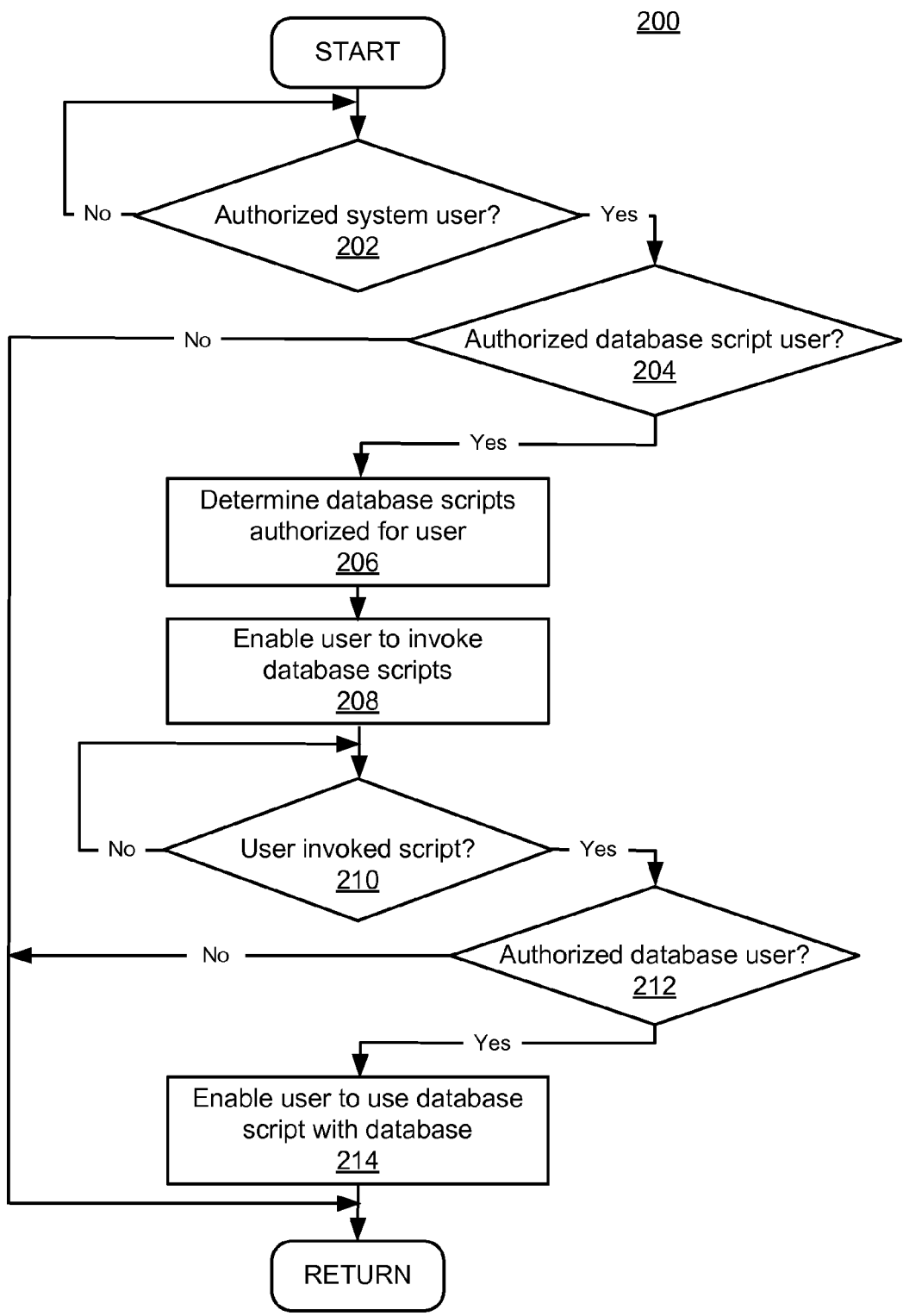
FIG. 2 is a flowchart of steps performed in accordance with an embodiment of the present invention for controlling access to database information.

FIG. 2 is a flowchart 200 of steps performed in accordance with an embodiment of the present invention for controlling access to database information. Flowchart 200 includes processes of the present invention which, in one embodiment, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 200, such steps are exemplary. That is, the present embodiment is well suited to performing various other steps or variations of the steps recited in FIG. 2. Within the present embodiment, it should be appreciated that the steps of flowchart 200 may be performed by software, by hardware or by any combination of software and hardware.

The present embodiment provides a method for automatically providing controlled access to information stored by a database. For example, a determination is made as to whether a user is authorized to access a database system. If not, the user is not granted access to the system. However, if the user is authorized, a determination is made as to whether the user is authorized to use any database scripts (or tools). If not, the process exits flowchart 200. Conversely, if the user is authorized to use any database scripts, it is determined which database scripts the user has been authorized to invoke and utilize. Subsequently, the user is enabled to invoke any of the database scripts he or she is authorized to invoke. When one or more database scripts are requested to be invoked by the user, a determination is made as to whether the system user is authorized to access the actual database and the information stored therein. If not, the process exits flowchart 200. However, if the user is authorized to access the database, the user is enabled to utilize one or more of the requested database scripts with the database information. In this manner, the user's access to database information is limited by the database scripts that he or she has been specifically granted access to use.

At step 202 of FIG. 2, a determination is made as to whether a system user is authorized to access a database system. If the user is unauthorized to access the database system, the process proceeds to the beginning of step 202. However, if the user is authorized to access the database system, the process proceeds to step 204. It is understood that the determination of step 202 may be implemented in a wide variety of ways in accordance with the present embodiment. For example, a login process involving a username and password as described herein may be utilized to implement step 202. Alternatively, any type of information specifically associated with the user may be received and validated in order to determine whether the user has been authorized to utilize the database system.

In step 204, a determination is made as to whether the user is authorized to invoke and operate one or more database scripts (or tools) resident to the database system. If the user is not authorized to invoke and operate any database scripts of the database system, the process exits flowchart 200. Conversely, if the user is authorized to utilize one or more database scripts of the database system, the process proceeds to step 206. It is appreciated that the determination of step 204 may be implemented in diverse ways in accordance with the present embodiment. For example, information identifying the user may be checked against stored information to determine whether the user is authorized to use any database scripts.

At step 206 of FIG. 2, a determination is made as to which specific database scripts (or tools) of the database system the user has been granted access to invoke and operate. It is noted that the determination of step 206 may be implemented in a wide variety of ways in accordance with the present embodiment. For example, determining which database scripts the user is authorized to use may be performed in any manner described herein. However, the determination of step 206 is not limited in anyway to these implementations.

In step 208, the user is enabled to invoke the database scripts (or tools) that he or she is authorized to utilize. The user may be enabled at step 208 to invoke authorized database scripts in diverse ways in accordance with the present embodiment. For example, the user may be provided a list of database scripts that he or she is authorized to invoke and operate with the database. Furthermore, the list of approved database scripts may be used to invoke one or more of the listed scripts. Alternatively, the user may be provided a web page which includes the names or references of the authorized database scripts which may be invoked by selecting one or more of them. Additionally, the user may be enabled to invoke one or more authorized database scripts in any manner similar to that described herein, but is not limited to those implementations.

In step 210 of FIG. 2, a determination is made as to whether the user has invoked one or more database scripts (or tools) to operate in conjunction with the database. If not, the process proceeds to the beginning of step 210. However, if the user has invoked one or more database scripts at step 210, the process proceeds to step 212. The determination of step 210 may be performed in a wide variety of ways in accordance with the present embodiment. For example, the user may select one or more database scripts of a web page indicating that he or she desires to invoke those database scripts. Alternatively, the user may transmit identifiers corresponding to one or more database scripts to a server indicating a request to invoke those database scripts. Moreover, the user may invoke one or more database scripts in any manner similar to those described herein, but is not limited to those implementations.

At step 212, a determination is made as to whether the user associated with the invocation of one or more database scripts is authorized to access the actual database. If the user is unauthorized to access the actual database, the process exits flowchart 200. Conversely, if the user is an authorized database user, the process proceeds to step 214. The determination of step 212 may be implemented in diverse ways in accordance with the present embodiment. For example, a login process involving a database username and a database password as described herein may be utilized to implement step 212. Alternatively, any type of information specifically associated with the user and the database may be received and validated in order to determine whether the user is authorized to utilize the database.

At step 214 of FIG. 2, the user is enabled to utilize the one or more requested database scripts (or tools) in conjunction with the database. The user may be enabled at step 214 to utilize authorized database scripts with the database in a wide variety of ways in accordance with the present embodiment. For example, the one or more requested database scripts may be enabled for the user by having them run against a database account (or schema) that has substantially unrestricted access to information stored by the database. In this manner, the database account is utilized as a proxy for operating the database script(s). It is noted that the database account may be implemented as a read-only account or schema in order to provide another level of security for the information stored by the database. It is understood that the scripts that operate in conjunction with the database are associated with and/or are linked to information stored by the database. Additionally, when information is added, deleted and/or modified to database server 110 and linked to specific scripts, it is automatically available to users granted access to invoke and operate one or more of those scripts. Once step 214 is completed, the process exits flowchart 200.

Figure 3:
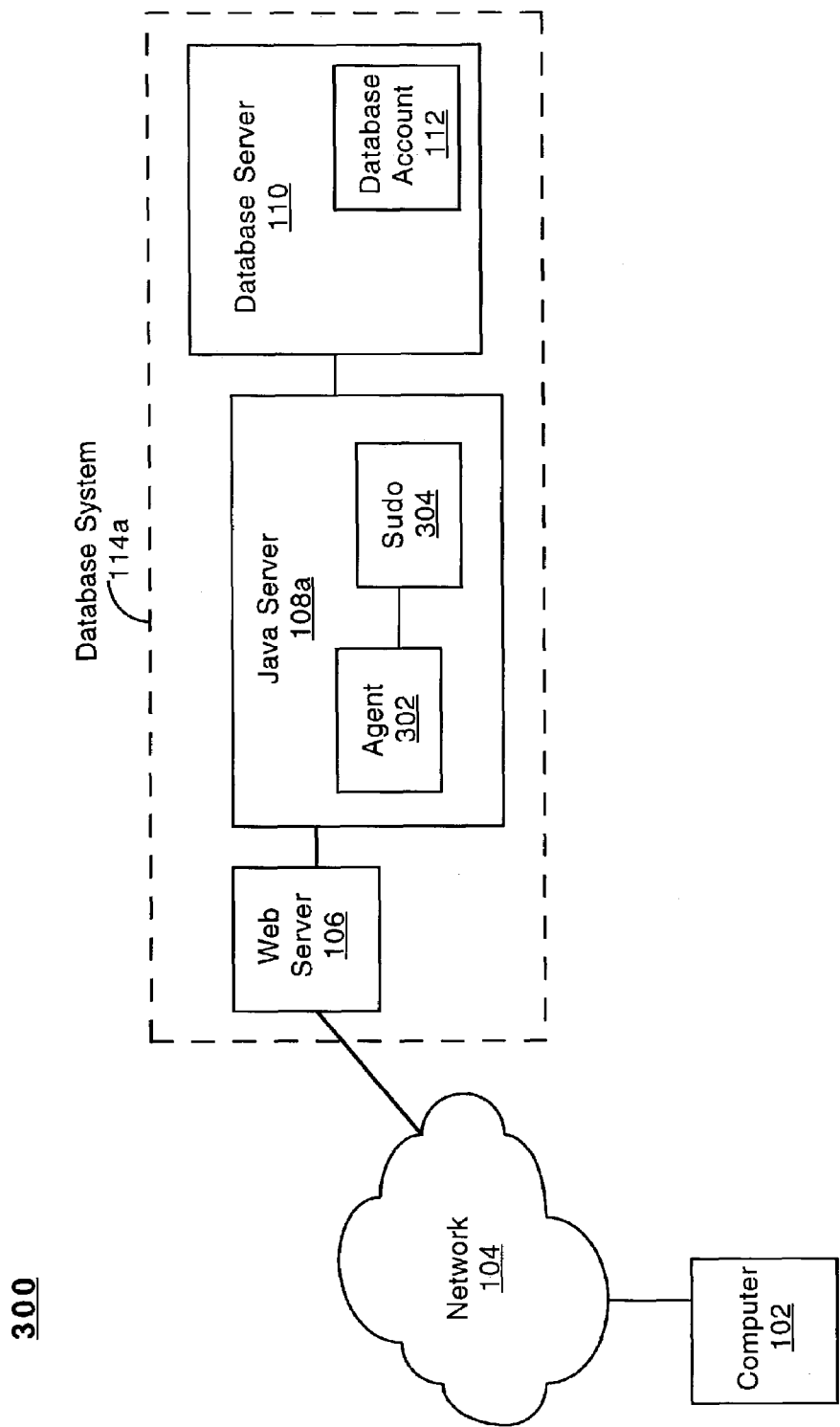
FIG. 3 is a block diagram of an exemplary system that includes a database system for controlling access to database information and scripts in accordance with an embodiment of the present invention.

FIG. 3 is a block diagram of an exemplary system 300 that includes a database system 114a for controlling access to database information and scripts in accordance with an embodiment of the present invention. Within system 300, a web server 106 provides a controlled interface through which database queries can be issued by an authorized user of a computer 102. Additionally, web server 106 provides a controlled interface through which scripts (or tools) that operate in conjunction with Java server 108a may be utilized by an authorized user of computer 102. Each authorized user may be granted access to specific scripts (or tools) that operate in conjunction with the Java server 108a or information stored by database server 110. Upon logging into the system via web server 106, a user can be provided via the controlled interface a selection of scripts that the user is authorized to use in conjunction with Java server 108a and/or information stored by database server 110. Therefore, in this manner a user's access to information of Java server 108a and/or database 110 is restricted by the scripts he or she can use with Java server 108a and/or database server 100, respectively.

It is understood that the database queries can get run against a pre-created read-only account (or schema) which can access substantially any information stored within database server 110. As such, when new information is added to the database 110 and linked to specific scripts, it is automatically available to users granted access to use one or more of those scripts.

Specifically, when computer 102 is communicatively coupled to web server 106 via network 104, a login process may be initiated in order to determine whether the user of computer 102 has been authorized to access database system 114a. It is understood that there are a wide variety of ways to implement a login process in accordance with the present embodiment. For example, the login process may be implemented in any manner similar to those described herein, but is not limited to such. If web server 106 determines that the user is an authorized user, it then determines what scripts (or tools), if any, the user is authorized to use with database server 110 and/or Java server 108a. This determination may involve, but is not limited to, web server 106 accessing one or more of its files to retrieve this information. It is understood that a "superuser" of database system 114a may define beforehand which scripts each authorized user may be able to invoke and utilize in conjunction with database server 110 and/or Java server 108a.

If the user is authorized to use one or more scripts, web server 106 may then provide a list of them to computer 102 (via network 104) as part of a web page. Therefore, in this manner the user of computer 102 is provided the choice of which scripts he or she would like to invoke and use in conjunction with Java server 108a and/or database server 110.

Within FIG. 3, once computer 102 transmits a request to web server 106 in order to invoke one or more scripts that its user is authorized to use, the web server 106 transfers that script request along with the accompanying username and password of the requesting user to Java server 108a. Upon reception, Java server 108a may then determine whether the received username and password associated with the script request represents a valid user. In this manner, a re-verification process is performed on the submitted username and password. If the username and password are invalid, Java server 108a rejects the script request and subsequently notifies web server 106 of this rejection. As such, web server 106 may then notify computer 102 (via network 104) of the rejection.

However, if the username and password are valid, Java server 108a may determine whether the user is currently authorized to invoke and use the script(s) he or she is requesting to use in conjunction with Java server 108a and/or database server 110. In this manner, a re-verification process is performed as to whether the user is authorized to operate the requested script(s). This determination may be done in diverse ways. For example, for each script (or tool) there may be a stored metadata file that describes which users are currently authorized to run that script. As such, Java server 108a may access each metadata file associated with the request in order to determine if the user is authorized to operate that script. If the user is not authorized to use one or more of the requested scripts, Java server 108a may specifically reject each script request and notify web server 106 of any rejections. In response, web server 106 may then notify computer 102 (via network 104) of any script rejections.

It is noted that Java server 108a is running under a Unix account referred to as Agent 302. Within the present embodiment of Java server 108a, there may be two accounts for running scripts (or tools) within Java server 108a and/or database server 110. For example, there may be an applications (APPS) system account and an organization (ORG), e.g., Oracle Corporation, system account and each is able to invoke and operate specific scripts. As such, if the user is authorized to use one or more of the requested scripts (or tools), Java server 108a invokes a wrapper (not shown) associated with each request script and passes information to each script wrapper.

For example, the information passed to a script wrapper may include which account (e.g., APPS or ORG) the script should actually run as when operating. Additionally, the information passed to a script wrapper may include a precreated username and password (e.g., that may both be encrypted and stored in a secure location) for a database account 112. Furthermore, the information passed to a script wrapper may include the original username and password utilized to access database system 114a. Upon reception of this information, the script wrapper couples to Sudo (superuser do) 304 software in order to actually execute the script. It is noted that Sudo 304 allows the switch from one user (e.g., APPS system account) to another user (e.g., ORG system account) at run time of a script. It is appreciated that Sudo software is well known by those of ordinary skill in the art. The wrapper then provides Sudo 304 the information Java server 108a provided it which usually includes which user (e.g., APPS or ORG) Sudo 304 should run the script as.

Within FIG. 3, Sudo 304 invokes the requested script as the appropriate user (e.g., APPS or ORG) thereby enabling the user of computer 102 to operate it within Java server 108a. It is noted that the script runs something and then returns the results back to computer 102 for its user. The username and password of database account 112 may also be passed via the Java Server 108a and the wrapper script to the requested script. If the requested script is a database script, it can use the database account information to couple to the appropriate schema. The results may be returned to computer 102 by having them stored in one or more files that are accessed by web server 106 (e.g., via a web application) which may provide the results as part of a web page received by computer 102. By defining which Java server 108a scripts the user of computer 102 is authorized to invoke, a superuser of system 114a has limited (or restricted) the user's access to particular scripts along with their associated information.

It is understood that the database account username and password may be created or generated in a wide variety of ways. For example, the database account username and password may be generated in any manner similar to that described herein, but is not limited to those implementations. Furthermore, database account 112 provides a login process that may be implemented in diverse ways. For instance, the database account 112 login process may be implemented in any manner similar to those described herein, but is not limited to such. If the login process is successful, Sudo 304 is able to invoke the database script (or tool) through database account 112.

In this manner, the invoked scripts which involve database queries run against database account 112. As such, database account 112 is utilized as a proxy for operating the database scripts. It is understood that the user's access to information stored by database server 110 is limited by the database scripts the user has been authorized to invoke and use. Furthermore, when new information is added to database server 110 and linked to specific scripts, it is automatically available to users granted access to invoke and use one or more of those scripts.

Within FIG. 3, when one or more database scripts are operational on database server 110, any information they output are redirected to one or more files resident to Java server 108a. Furthermore, this output information is communicated by database server 110 to Java server 108a which then notifies web server 106 of this situation. In response to receiving this notification, web server 106 may provide another web page to computer 102 (via network 104) for displaying information and/or content stored by database server 110. Specifically, the web page application operating on web server 106 couples to Java server 108a in order to read the one or more files which receive database output information from the operational database scripts. Once read, the web page application operating on web server 106 may provide that information within the web page presented to computer 102 via network 104.

System 300 includes computer 102, network 104, web server 106, Java server 108a, database server 110 and database system 114a. It is noted that computer 102, network 104, web server 106, Java server 108a, database server 110 and database system 114a may be coupled and implemented in a manner similar to system 100 as described herein. Additionally, Java server 108a may be implemented in a manner similar to Java server 108 as described herein.

Figure 4:
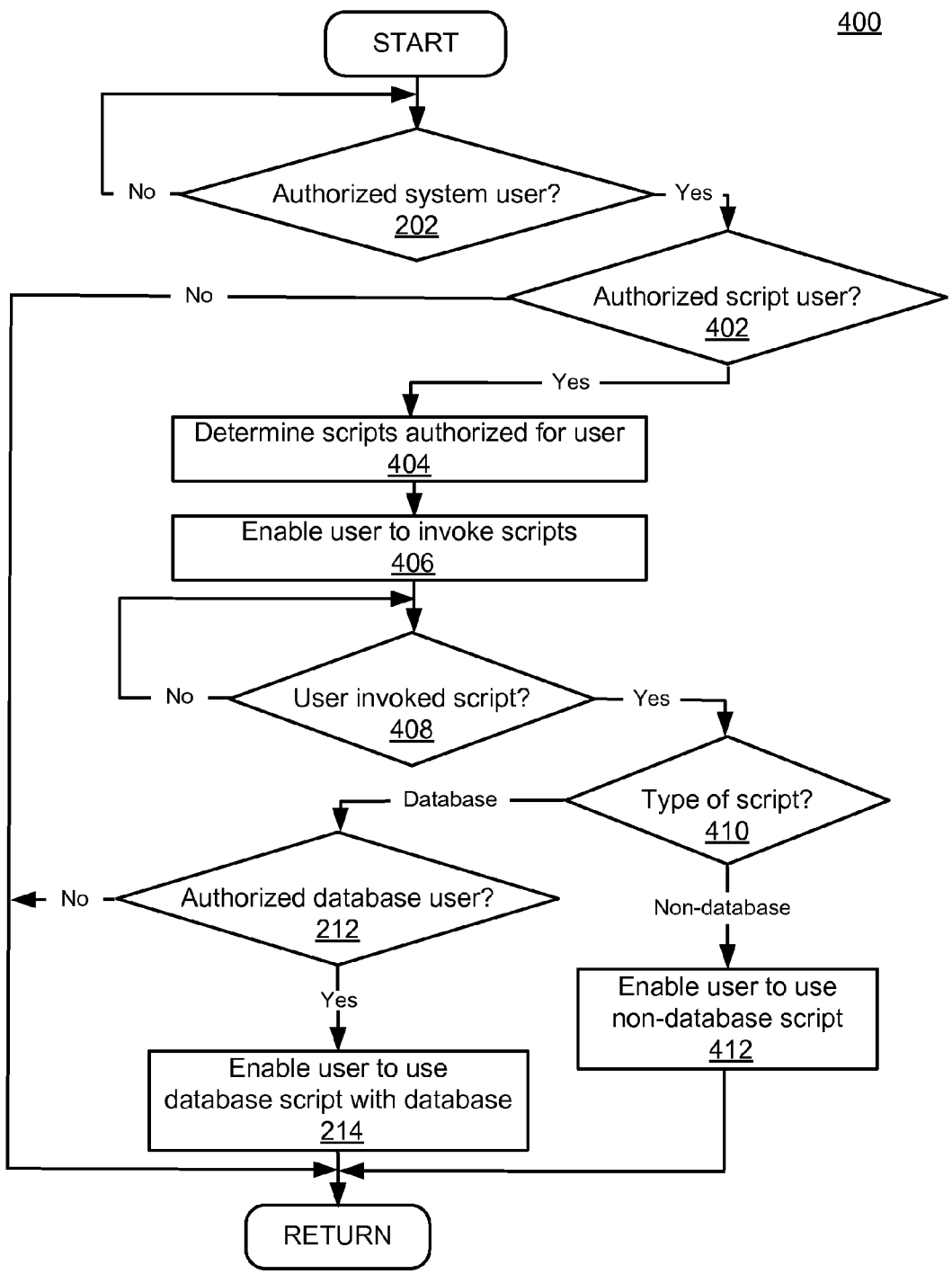
FIG. 4 is a flowchart of steps performed in accordance with an embodiment of the present invention for controlling access to information and scripts.

FIG. 4 is a flowchart 400 of steps performed in accordance with an embodiment of the present invention for controlling access to information and scripts. Flowchart 400 includes processes of the present invention which, in one embodiment, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 400, such steps are exemplary. That is, the present embodiment is well suited to performing various other steps or variations of the steps recited in FIG. 4. Within the present embodiment, it should be appreciated that the steps of flowchart 400 may be performed by software, by hardware or by any combination of software and hardware.

The present embodiment provides a method for automatically providing controlled access to information and/or scripts. For example, a determination is made as to whether a user is authorized to access a system. If not, the user is not granted access to the system. However, if the user is authorized, a determination is made as to whether the user is authorized to use any scripts (or tools). If not, the process exits flowchart 400. However, if the user is authorized to use any scripts, it is determined which scripts (e.g., database or non-database) the user has been authorized to invoke and utilize. Subsequently, the user is enabled to invoke any of the scripts he or she is authorized to invoke. When one or more scripts are requested to be invoked by the user, a determination is made as to which type of script (e.g., database or non-database) the user is requesting to invoke. If the script is a non-database script, the user is then enabled to use that non-database script. In this manner, the user's access to non-database scripts along with their associated information is limited by the access granted to the user.

Conversely, if the script is a database script, a determination is made as to whether the user is authorized to access the actual database and the information stored therein. If not, the process exits flowchart 400. However, if the user is authorized to access the database, the user is enabled to utilize one or more of the requested database scripts with the database information. In this manner, the user's access to database information is limited by the database scripts that he or she has been specifically granted access to use.

It is noted that steps 202, 212 and 214 of FIG. 4 operate in a manner similar to steps 202, 212 and 214 of FIG. 2. However, if the user is authorized to access the database system at step 202 of FIG. 4, the process proceeds to step 402. At step 402, a determination is made as to whether the user is authorized to invoke and operate one or more scripts (or tools) resident to the system. If the user is not authorized to invoke and operate any scripts of the system, the process exits flowchart 400. Conversely, if the user is authorized to utilize one or more scripts of the system, the process proceeds to step 404. It is appreciated that the determination of step 402 may be implemented in diverse ways in accordance with the present embodiment. For example, information identifying the user may be checked against stored information to determine whether the user is authorized to use any scripts.

At step 404 of FIG. 4, a determination is made as to which specific scripts (e.g., database or non-database) of the system the user has been granted access to invoke and operate. It is noted that the determination of step 404 may be implemented in a wide variety of ways in accordance with the present embodiment. For example, determining which scripts the user is authorized to use may be performed in any manner described herein. However, the determination of step 404 is not limited in anyway to these implementations.

In step 406, the user is enabled to invoke the scripts (or tools) that he or she is authorized to use. The user may be enabled at step 406 to invoke authorized scripts in diverse ways in accordance with the present embodiment. For example, the user may be provided a list of scripts (e.g., database or non-database) that he or she is authorized to invoke and operate with the system. Furthermore, the list of approved scripts may be used to invoke one or more of the listed scripts. Alternatively, the user may be provided a web page which includes the names or references of the authorized scripts which may be invoked by selecting one or more of them. Additionally, the user may be enabled to invoke one or more authorized scripts in any manner similar to that described herein, but is not limited to those implementations.

In step 408 of FIG. 4, a determination is made as to whether the user has invoked one or more scripts (e.g., database or non-database) to operate in conjunction with the system. If not, the process proceeds to the beginning of step 408. Conversely, if the user has invoked one or more scripts at step 408, the process proceeds to step 410. The determination of step 408 may be performed in a wide variety of ways in accordance with the present embodiment. For example, the user may select one or more scripts (e.g., database or non-database) of a web page indicating that he or she desires to invoke those scripts. Alternatively, the user may transmit identifiers corresponding to one or more scripts to a server indicating a request to invoke those scripts. Moreover, the user may invoke one or more scripts in any manner similar to those described herein, but is not limited to those implementations.

At step 410, a determination is made as to which type of script (e.g., database or non-database) the user is requesting to invoke. If determined that it is a database script, the process proceeds to step 212. However, if determined that it is a non-database script, the process proceeds to step 412.

At step 412 of FIG. 4, the user is enabled to utilize the one or more requested non-database scripts (or tools) in conjunction with the system. In this manner, the user's access to non-database scripts along with their associated information is limited by the access granted to the user. The user may be enabled at step 412 to utilize authorized non-database scripts with the system in a wide variety of ways in accordance with the present embodiment. For example, the one or more requested non-database scripts may be enabled for the user by, but is not limited to, having them invoked by Sudo software. Once step 412 is completed, the process exits flowchart 400.

It is noted that flowchart 400 may be modified such that the user is enabled to utilize requested database scripts and requested non-database scripts simultaneously. For example, after the completion of step 214 or step 412, a determination may be made as to whether there are any remaining requested scripts to enable for the user. If so, the process proceeds to the beginning of step 410. If not, the process exits flowchart 400.

Figure 5:
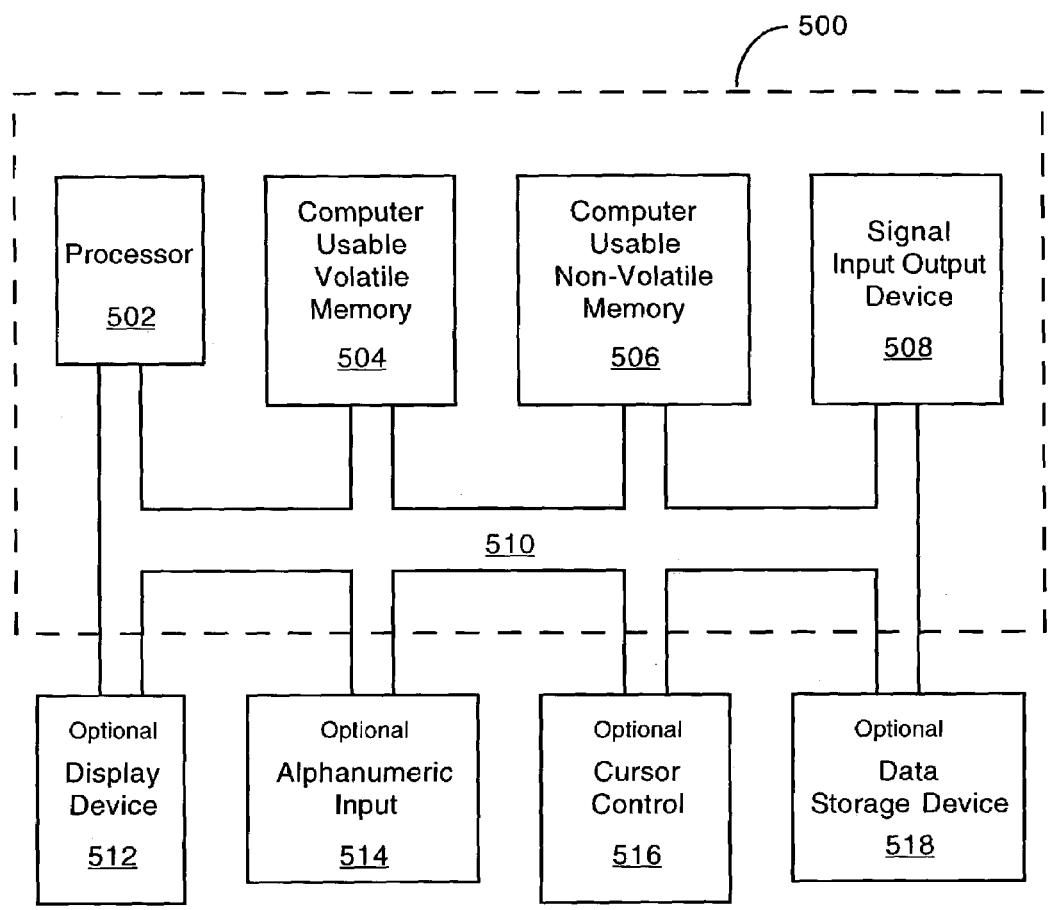
FIG. 5 is a block diagram of an exemplary computer system that may be used in accordance with embodiments of the present invention.

FIG. 5 is a block diagram of an exemplary computer system 500 that may be used in accordance with embodiments of the present invention. It is understood that system 500 is not strictly limited to be a computer system. As such, system 500 of the present embodiment is well suited to be any type of computing device (e.g., server computer, desktop computer, laptop computer, portable computing device, etc.). Within the discussions of the present invention herein, certain processes and steps were discussed that may be realized, in one embodiment, as a series of instructions (e.g., software program) that reside within computer readable memory units of computer system 500 and executed by a processor(s) of system 500. When executed, the instructions cause computer 500 to perform specific actions and exhibit specific behavior which are described herein.

Computer system 500 comprises an address/data bus 510 for communicating information, one or more central processors 502 coupled with bus 510 for processing information and instructions. Central processor unit(s) 502 may be a microprocessor or any other type of processor. The computer 500 also includes data storage features such as computer usable volatile memory 504, e.g., random access memory (RAM), static RAM, dynamic RAM, etc., coupled with bus 510 for storing information and instructions for central processor(s) 502, computer usable non-volatile memory 506, e.g., read only memory (ROM), programmable ROM, flash memory, erasable programmable read only memory (EPROM), electrically erasable programmable read only memory (EEPROM), etc., coupled with bus 510 for storing static information and instructions for processor(s) 502.

System 500 of FIG. 5 also includes one or more signal generating and receiving devices 508 coupled with bus 510 for enabling system 500 to interface with other electronic devices. The communication interface(s) 508 of the present embodiment may include wired and/or wireless communication technology. For example, in one embodiment of the present invention, the communication interface 508 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 508 may include a cable modem or a DSL modem. Additionally, the communication interface(s) 508 may provide a communication interface to the Internet.

Optionally, computer system 500 can include an alphanumeric input device 514 including alphanumeric and function keys coupled to the bus 510 for communicating information and command selections to the central processor(s) 502. The computer 500 can also include an optional cursor control or cursor directing device 516 coupled to the bus 510 for communicating user input information and command selections to the processor(s) 502. The cursor directing device 516 can be implemented using a number of well known devices such as a mouse, a track ball, a track pad, an optical tracking device, a touch screen, etc. Alternatively, it is appreciated that a cursor can be directed and/or activated via input from the alphanumeric input device 514 using special keys and key sequence commands. The present embodiment is also well suited to directing a cursor by other means such as, for example, voice commands.

The system 500 of FIG. 5 can also include a computer usable mass data storage device 518 such as a magnetic or optical disk and disk drive (e.g., hard drive or floppy diskette) coupled with bus 510 for storing information and instructions. An optional display device 512 is coupled to bus 510 of system 500 for displaying video and/or graphics. It should be appreciated that optional display device 512 may be a cathode ray tube (CRT), flat panel liquid crystal display (LCD), field emission display (FED), plasma display or any other display device suitable for displaying video and/or graphic images and alphanumeric characters recognizable to a user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling access to system information, said method comprising:

determining whether a user is authorized to access a system;

provided said user is authorized to access said system, determining whether said user is further authorized to access a script within said system; and provided said user is authorized to access said script within said system, enabling said user to invoke said script within said system to access information within said system, wherein said script restricts said user access to said information, and wherein said information is linked to said script, and wherein new information within said system that is linked to said script is automatically accessible via said script and in response to said user subsequently invoking said script.

2. The method as described in claim 1, wherein said script comprises a database script for use with a database of said system.

3. The method as described in claim 2, further comprising: determining whether said user is authorized to access said database.

4. The method as described in claim 1, further comprising: determining whether said script has been invoked; and provided said script has been invoked, determining whether said invoked script is a database script or a non-database script.

5. The method as described in claim 4, further comprising: provided said invoked script is said database script, wherein said enabling said user to invoke said script comprises utilizing an account that has substantially unrestricted access to said information linked to said script of a database of said system.

6. The method as described in claim 5, wherein said enabling said user to invoke said script comprises said account using a schema associated with said invoked script.

7. The method as described in claim 6 further comprising: using a different schema prior to invoking a script in response to said invocation by said user such that said invoked script operates substantially the same as a script directly operating in the intended schema.

8. The method as described in claim 5, wherein said account comprises a read-only account.

9. The method as described in claim 1, wherein said determining whether said user is authorized to access said system comprises utilizing a system username and a system password.

10. The method as described in claim 1, further comprising:

utilizing a web interface to provide access to said system.

11. The method as described in claim 10, wherein said web interface indicates which script said user is authorized to use with said system.

12. The method as described in claim 1, further comprising:

when said user is authorized to access said script, internally retrieving a pre-created username and a pre-created password for an account related to said user, wherein said internal retrieval is operable to provide additional security.

13. The method as described in claim 1, further comprising:

providing a list of scripts that said user is authorized to access.

14. A system for controlling access to database information, said system comprising:

means for ascertaining whether a user is authorized to access a system;

means for ascertaining whether said user is further authorized to access a database script within a database of said system, provided said user is authorized to access said system; and means for capacitating said user to operate said database script within said database to access information stored by said database, provided said user is authorized to access said database script within said database, wherein said database script restricts said user access to said information, and wherein said information is linked to said database script, and wherein new information within said system that is linked to said script is automatically accessible via said script and in response to said user subsequently operating said database script.

15. The system as described in claim 14, further comprising:

means for ascertaining whether said user is authorized to access said database.

16. The system as described in claim 14, wherein said means for capacitating said user to operate said database script comprises:

means for utilizing an account that has substantially unrestricted access to said information linked to said database script of said database.

17. The system as described in claim 16, wherein said account is utilized as a proxy for operating said database script.

18. The system as described in claim 16, wherein said account uses a schema associated with said database script.

19. The system as described in claim 16, wherein said account comprises a read-only account.

20. The system as described in claim 14, wherein said means for ascertaining whether said user is authorized to access said system comprises a first username and a first password and said means for capacitating said user to operate said database script with said database comprises a second username and a second password.

21. The system as described in claim 14, further comprising:

means for utilizing a web interface to provide access to said system and said database.

22. A computer readable medium having computer readable code embodied therein for causing a system to perform:

determining whether a user is authorized to access a system;

provided said user is authorized to access said system, determining whether said user is further authorized to access a database script within a database of said system; and provided said user is authorized to access said database script within said database, capacitating said user to operate said database script within said database to access information stored by said database, wherein said database script restricts said user access to said information, and wherein said information is linked to said database script, and wherein new information within said system that is linked to said script is automatically accessible via said script and in response to said user subsequently operating said database script.

23. The computer readable medium as described in claim 22, further comprising:

determining whether said user is authorized to access said database.

24. The computer readable medium as described in claim 22, whether said capacitating said user to operate said database script comprises:
utilizing a read-only account that has substantially unrestricted access said information linked to said database script of said database.

25. The computer readable medium as described in claim 24, wherein said read-only account uses a schema associated with said database script.

26. The computer readable medium as described in claim 24, wherein said read-only account is utilized as a proxy for operating said database script.

27. The computer readable medium as described in claim 22, wherein said ascertaining whether said user is authorized to access said system comprises utilizing a first username and a first password and said capacitating said user to operate said database script with said database comprises utilizing a second username and a second password.

28. The computer readable medium as described in claim 22, further comprising:
utilizing a web interface to provide access to said system and said database.

* * * * *